US012798315B2

(12) United States Patent
Yoshida

(10) Patent No.: US 12,798,315 B2
(45) Date of Patent: Nov. 17, 2026

(54) VEHICLE HAVING REAR SUSPENSION WITH UPPER AND LOWER ARMS

(71) Applicant: YAMAHA HATSUDOKI KABUSHIKI KAISHA, Iwata (JP)

(72) Inventor: Masahiro Yoshida, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 341 days.

(21) Appl. No.: 18/622,530

(22) Filed: Mar. 29, 2024

(65) Prior Publication Data

US 2024/0326533 A1 Oct. 3, 2024

(30) Foreign Application Priority Data

Mar. 31, 2023 (JP) ................................ 2023-059554

(51) Int. Cl.
*B60G 3/20* (2006.01)
*B60K 17/04* (2006.01)
*B62D 21/02* (2006.01)

(52) U.S. Cl.
CPC ................ *B60G 3/20* (2013.01); *B60K 17/04* (2013.01); *B62D 21/02* (2013.01); *B60G 2200/144* (2013.01); *B60G 2204/129* (2013.01); *B60G 2204/143* (2013.01); *B60G 2206/124* (2013.01)

(58) Field of Classification Search
CPC .... B60G 3/20; B60G 2200/144; B60K 17/04; B62D 21/02
See application file for complete search history.

(56) References Cited

U.S. PATENT DOCUMENTS

| | | | | |
|---|---|---|---|---|
| 5,004,061 | A * | 4/1991 | Andruet | B60L 50/52 180/65.6 |
| 7,637,343 | B2 * | 12/2009 | Nakagaki | B60K 17/22 180/908 |
| 7,770,907 | B2 | 8/2010 | Shimizu et al. | |
| 8,496,268 | B2 * | 7/2013 | Theodore | B60K 6/40 280/798 |
| 9,102,205 | B2 * | 8/2015 | Kvien | B60G 3/20 |
| 9,327,587 | B2 * | 5/2016 | Spindler | B62D 23/005 |
| 2007/0068715 | A1 * | 3/2007 | Mizutani | B60G 3/20 180/65.6 |
| 2014/0224564 | A1 * | 8/2014 | Maeda | B62D 21/183 180/291 |
| 2018/0072349 | A1 * | 3/2018 | Hisada | B62D 23/005 |
| 2023/0029991 | A1 * | 2/2023 | Tanaka | B62K 25/04 |

* cited by examiner

*Primary Examiner* — Timothy Hannon
(74) *Attorney, Agent, or Firm* — Rabin & Berdo, P.C.

(57) ABSTRACT

A vehicle including: a body frame; a seat provided on the body frame; a pair of front wheels provided at a front portion of the body frame; a pair of rear wheels provided at a rear portion of the body frame; a rear gear provided between the pair of rear wheels; a drive source provided below the seat; and a pair of suspensions each including an upper arm and a lower arm, and respectively supporting the pair of rear wheels. The lower arm in each of the suspensions includes: a front arm portion, connected with the body frame at a position more forward than a rear end of the drive source in a fore-aft direction of the vehicle, and a rear arm portion, connected with the body frame at a position more rearward than a center of the rear gear in the fore-aft direction of the vehicle.

18 Claims, 13 Drawing Sheets

10

A-A section

VEHICLE HAVING REAR SUSPENSION WITH UPPER AND LOWER ARMS

CROSS REFERENCE TO RELATED APPLICATIONS

This application is based upon and claims the benefit of priority of the prior Japanese Patent Application No. 2023-059554, filed on Mar. 31, 2023, the entire contents of which are incorporated herein by reference.

BACKGROUND OF THE INVENTION

Field of the Invention

The present invention relates to vehicles, and more specifically to a straddled vehicle such as an ATV (All Terrain Vehicle).

Description of the Related Art

As an example of conventional techniques of this kind, U.S. Pat. No. 7,770,907 discloses a straddled vehicle. The vehicle includes a lower pipe; a rear pipe extending upward from a rear end of the lower pipe; a rear suspension arm support pipe connecting the lower pipe and the rear pipe; and a rear wheel suspension supporting a rear wheel. The rear wheel suspension connects a rear portion of the lower pipe with a rear portion of the rear suspension arm support pipe. The rear wheel suspension includes a lower arm having a front arm portion and a back arm portion and connected with a rear portion of the lower pipe; an upper arm connected with the rear suspension arm support pipe; and a rear wheel shock absorber disposed between the back arm portion of the lower arm and the rear pipe.

In the vehicle, the front arm portion and the back arm portion of the lower arm are slanted with respect to the lower pipe, at substantially the same angle as each other and then connected with the lower pipe. In other words, the front arm portion and the back arm portion have their respective end portions not very much spaced from each other at the place where they are connected with the lower pipe. Therefore, there is room for improvement in increasing an arm span of the lower arm thereby reducing stress on the lower arm and the lower pipe.

SUMMARY OF THE INVENTION

Therefore, a primary object of the present invention is to provide a vehicle in which stress on a lower arm and a body frame is reduced, and the lower arm and the body frame can be lighter.

According to an aspect of the present invention, there is provided a vehicle including a body frame; a saddle-style seat provided in the body frame; a pair of front wheels provided in a front portion of the body frame; a pair of rear wheels provided in a rear portion of the body frame; a rear gear provided between the pair of rear wheels; a drive source provided below the seat; and a suspension having an upper arm and a lower arm and supporting the rear wheel. The lower arm includes a front arm portion connected with the body frame at a position more forward than a rear end of the drive source in a fore-aft direction in a side view; and a rear arm portion connected with the body frame at a position more rearward than a center of the rear gear in a fore-aft direction in a side view.

In the present invention, in regards of the lower arm on the rear-wheel side suspension, the front arm portion is connected with the body frame at a position more forward than a rear end of the drive source in a fore-aft direction in a side view while the rear arm portion is connected with the body frame at a position more rearward than the center of the rear gear in a fore-aft direction in a side view. As described, the front arm portion is extended to a side of the drive source, so that the connection point where the front arm portion is connected with the body frame is located ahead. Also, the front arm portion and the rear arm portion are connected with the body frame in such a form that, in a plan view, both of them are opening with respect to a straight line which connects the centers of the pair of rear wheels. In other words, the front arm portion and the rear arm portion are slanted in a fore-aft direction with respect to the straight line which connects the centers of the pair of rear wheels. This makes it possible to increase an arm span of the lower arm, thereby decreasing stress on the lower arm and the body frame, and to decrease the weight of the lower arm and the body frame.

Preferably, the rear arm portion is connected with the body frame at a position more forward than a rear end of the rear gear in a fore-aft direction in a side view. In this case, it becomes possible to reduce scraping the bottom of the vehicle, i.e., the vehicle rubbing the ground with its bottom.

Further preferably, the front arm portion's point of connection with the body frame is more outboard than a point of connection where the rear arm portion is connected with the body frame. In this case, it becomes easy to slant the lower arm's pivot axis opening forward, making it easy to dispose the drive source at a rear position.

Further, preferably, the lower arm's pivot axis slants with respect to the vehicle's fore-aft direction in a plan view, having a front portion thereof opening outward. In this case, the lower arm's pivot axis slants to open forward, and it becomes easy to dispose the drive source at a rear position.

Preferably, the body frame includes a frame intermediate portion, and a frame rear portion extending rearward from the frame intermediate portion with its span in the vehicle's width direction becoming narrower than that of the frame intermediate portion, and the front arm portion is connected with the frame intermediate portion. In this case, it becomes possible to position the connection point where the front arm portion is connected with the body frame at a forward location, making it possible to increase the arm span of the lower arm.

Further preferably, the rear arm portion is connected with the frame rear portion. In this case, it becomes possible to position the connection point where the rear arm portion is connected with the body frame at a rearward location, making it possible to increase the arm span of the lower arm.

Further, preferably, the vehicle further includes a connection bracket extending in an up-down direction to connect the rear arm portion with the upper arm, and the connection bracket has its inboard side carved so as not to make contact with the rear gear. In this case, it becomes possible to secure appropriate length of the upper arm and of the lower arm, making it easy to assemble the rear gear.

Preferably, the suspension further includes a shock absorber connecting the body frame with the lower arm. In this case, it becomes possible to use a long shock absorber by connecting the shock absorber with the lower arm.

Further preferably, the shock absorber is ahead of the upper arm.

Further, preferably, the upper arm is formed in a bent shape to detour the shock absorber. In this case, it becomes easy to dispose the shock absorber ahead of the upper arm.

Preferably, the front arm portion has a bent portion, and the shock absorber is connected with the lower arm near the bent portion.

Further preferably, the lower arm further includes a reinforcing member connecting the bent portion with the rear arm portion, and the shock absorber is connected with the reinforcing member.

The above-described object and other objects, characteristics, aspects and advantages of the present invention will become clearer from the following detailed description of embodiments of the present invention to be made with reference to the attached drawings.

DETAILED DESCRIPTION OF THE PREFERRED EMBODIMENTS

Figure 1:
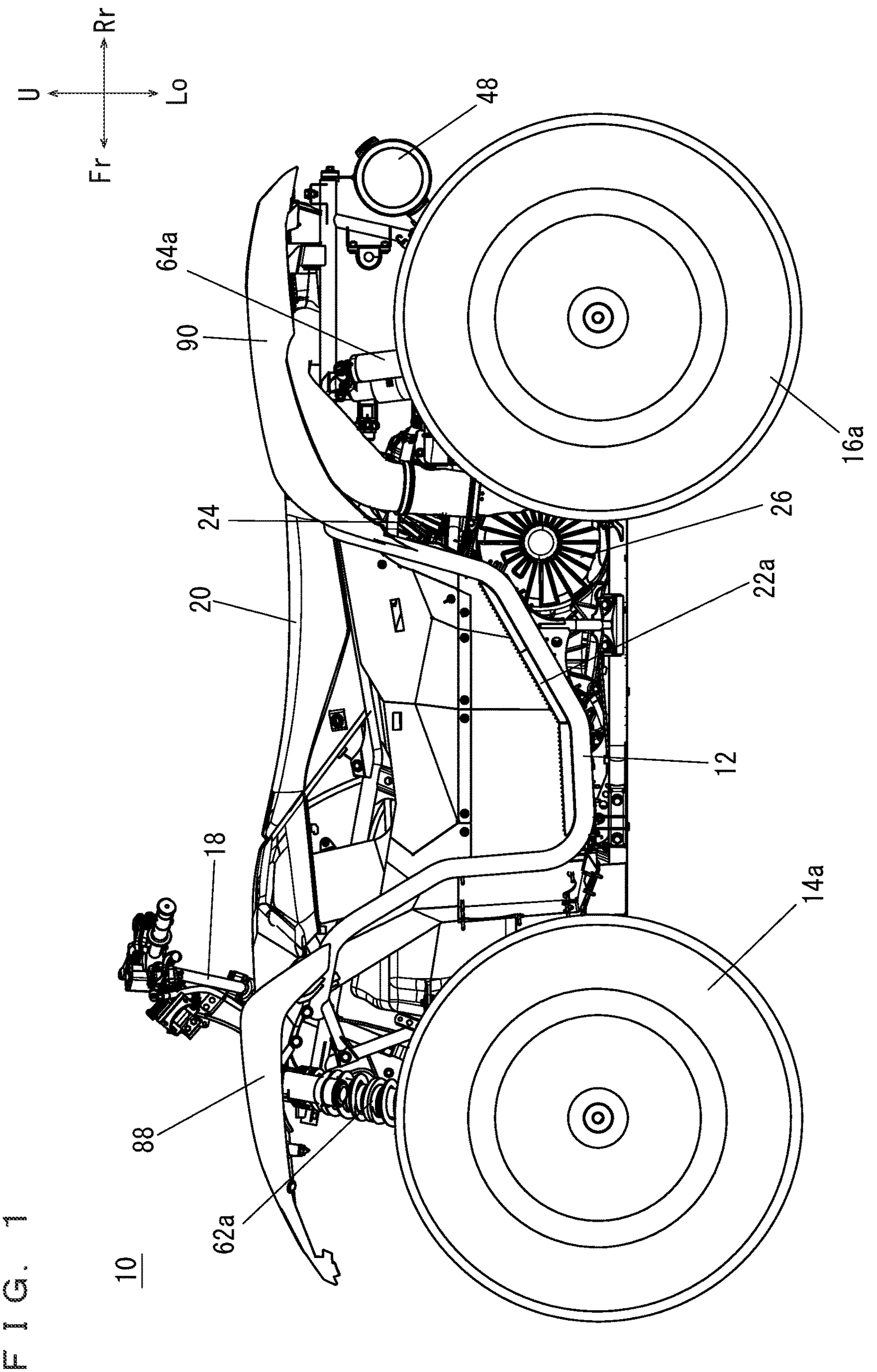
FIG. 1 is a side view which shows a vehicle according to an embodiment of the present invention.
Figure 2:
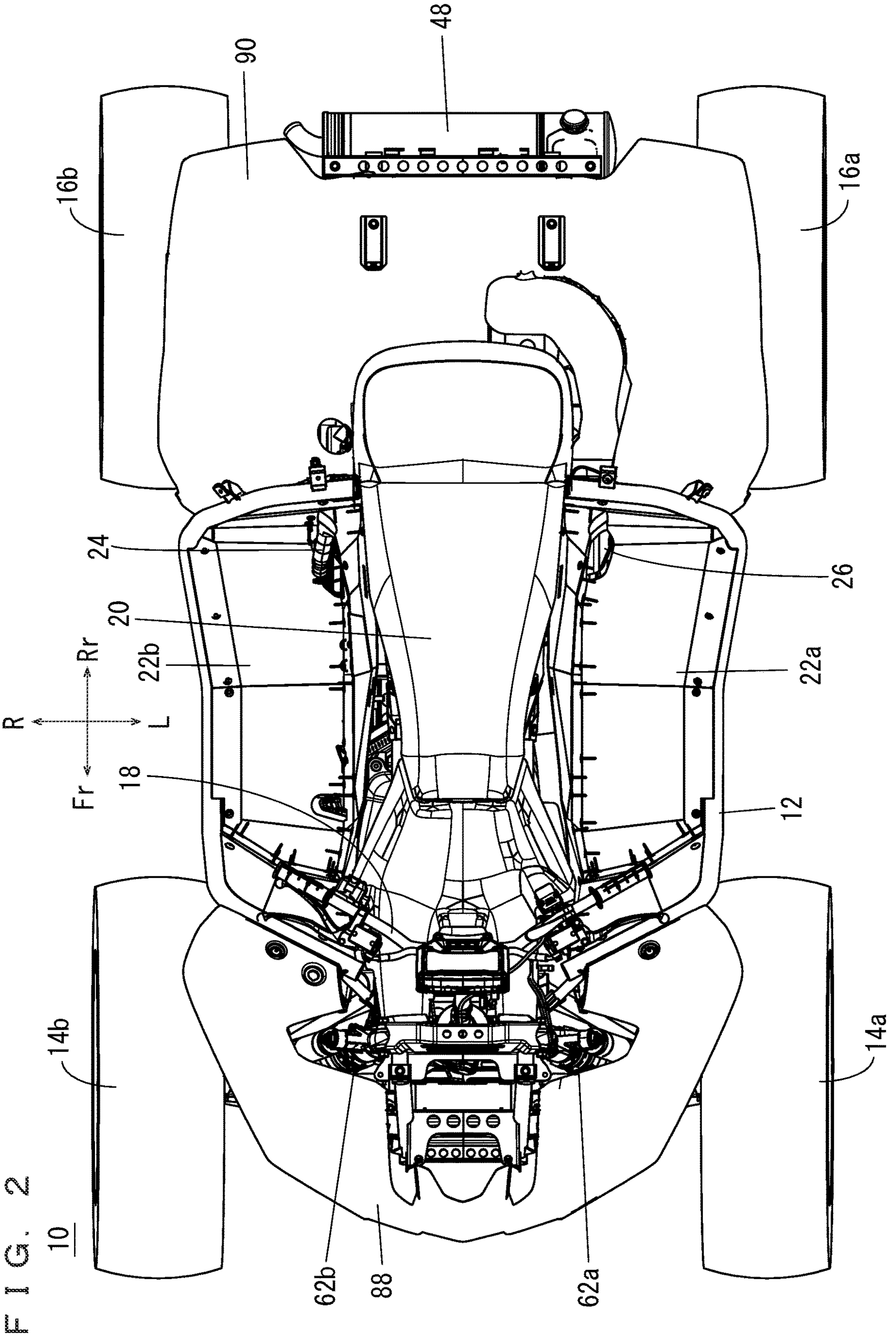
FIG. 2 is a plan view which shows the vehicle in FIG. 1.
Figure 3:
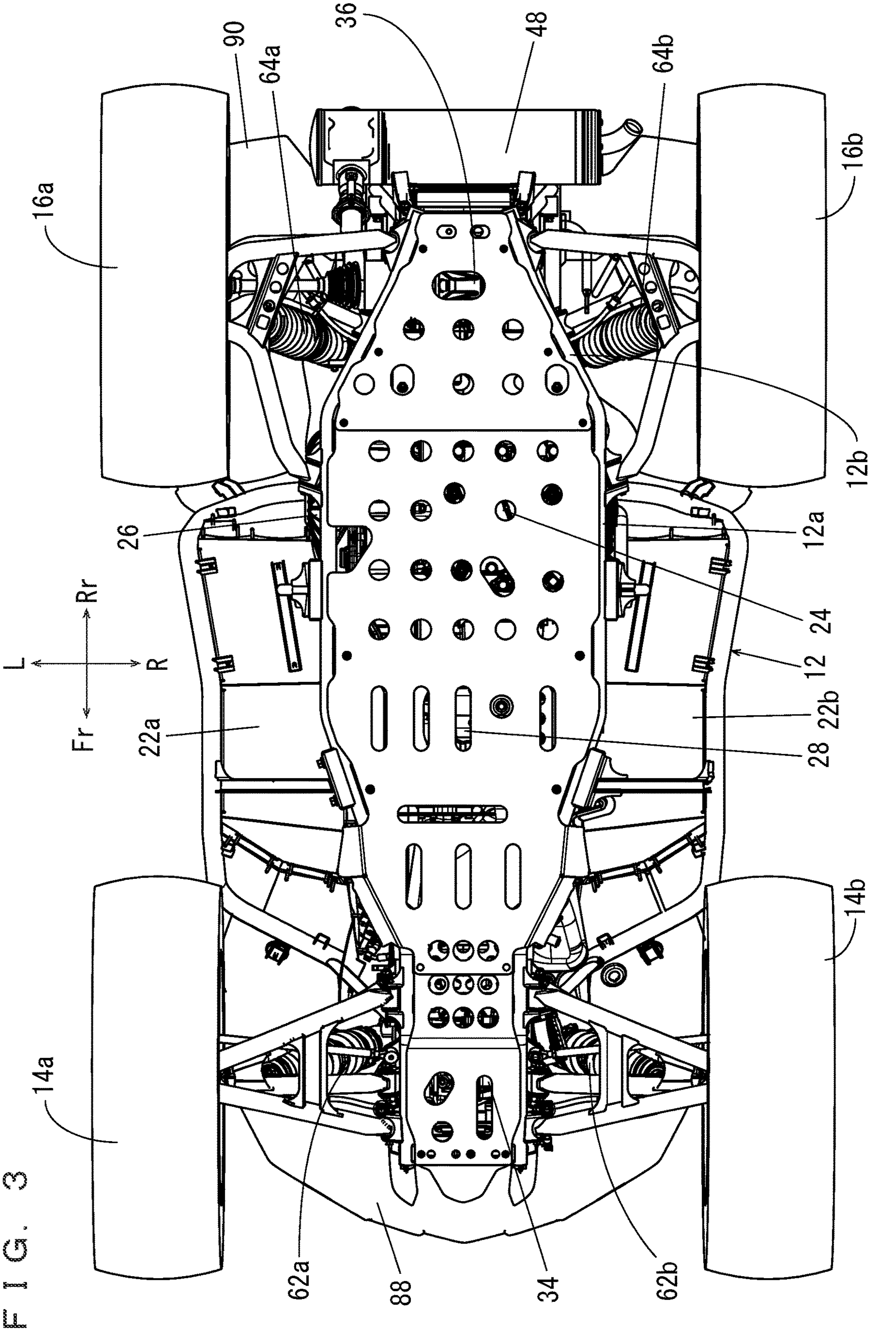
FIG. 3 is a bottom view which shows the vehicle in FIG. 1.
Figure 4:
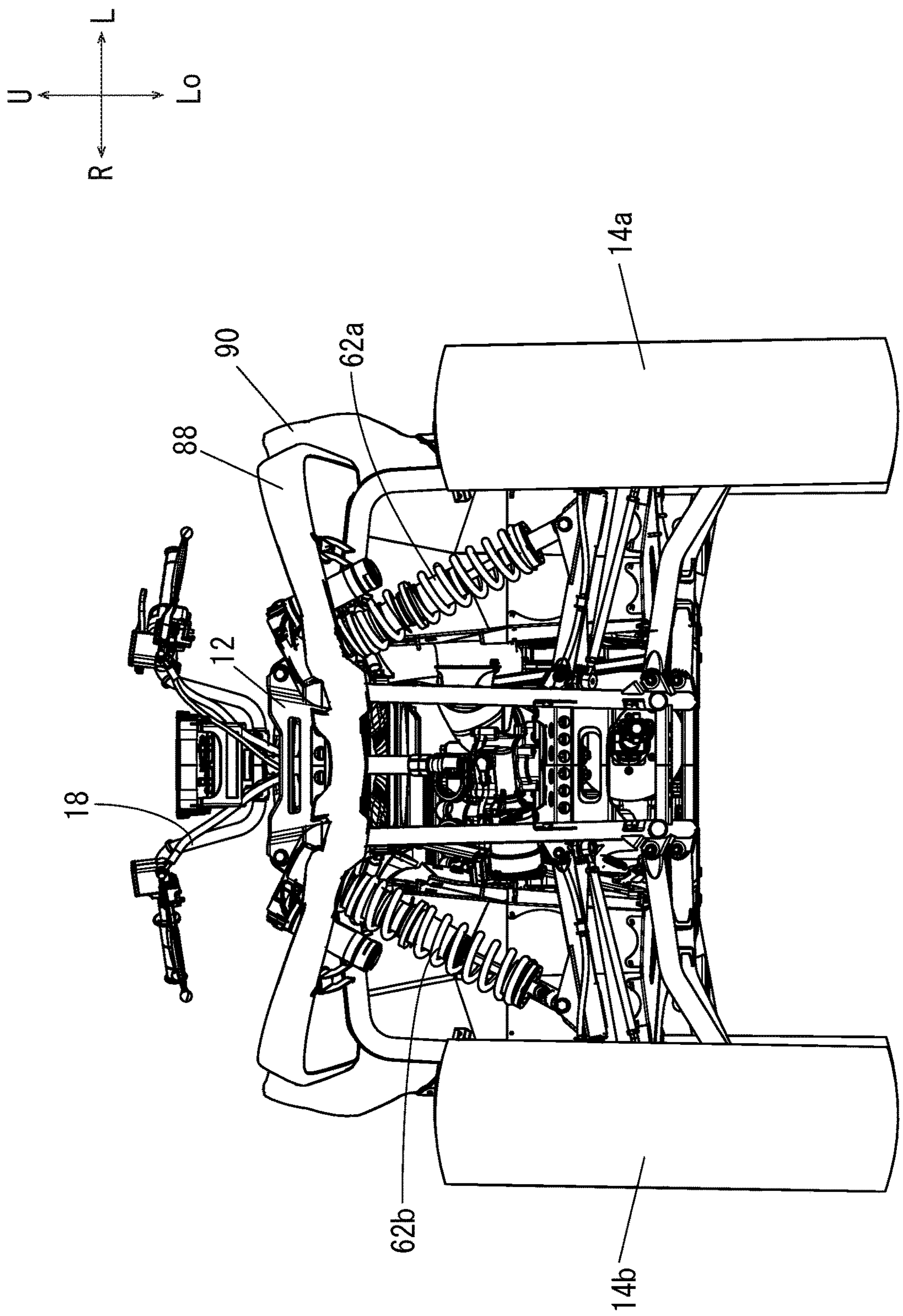
FIG. 4 is a front view which shows the vehicle in FIG. 1.
Figure 5:
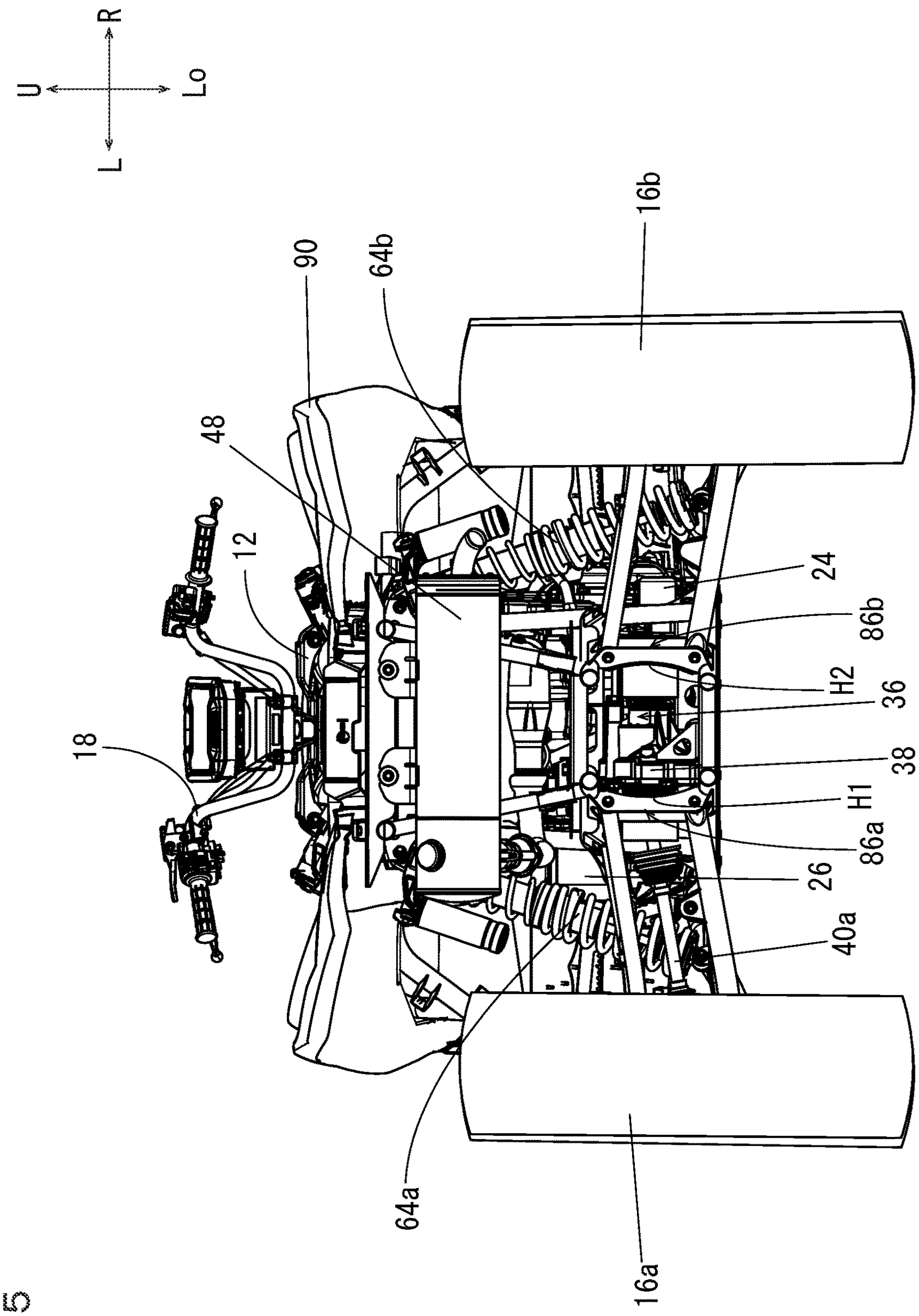
FIG. 5 is a rear view which shows the vehicle in FIG. 1.
Figure 6:
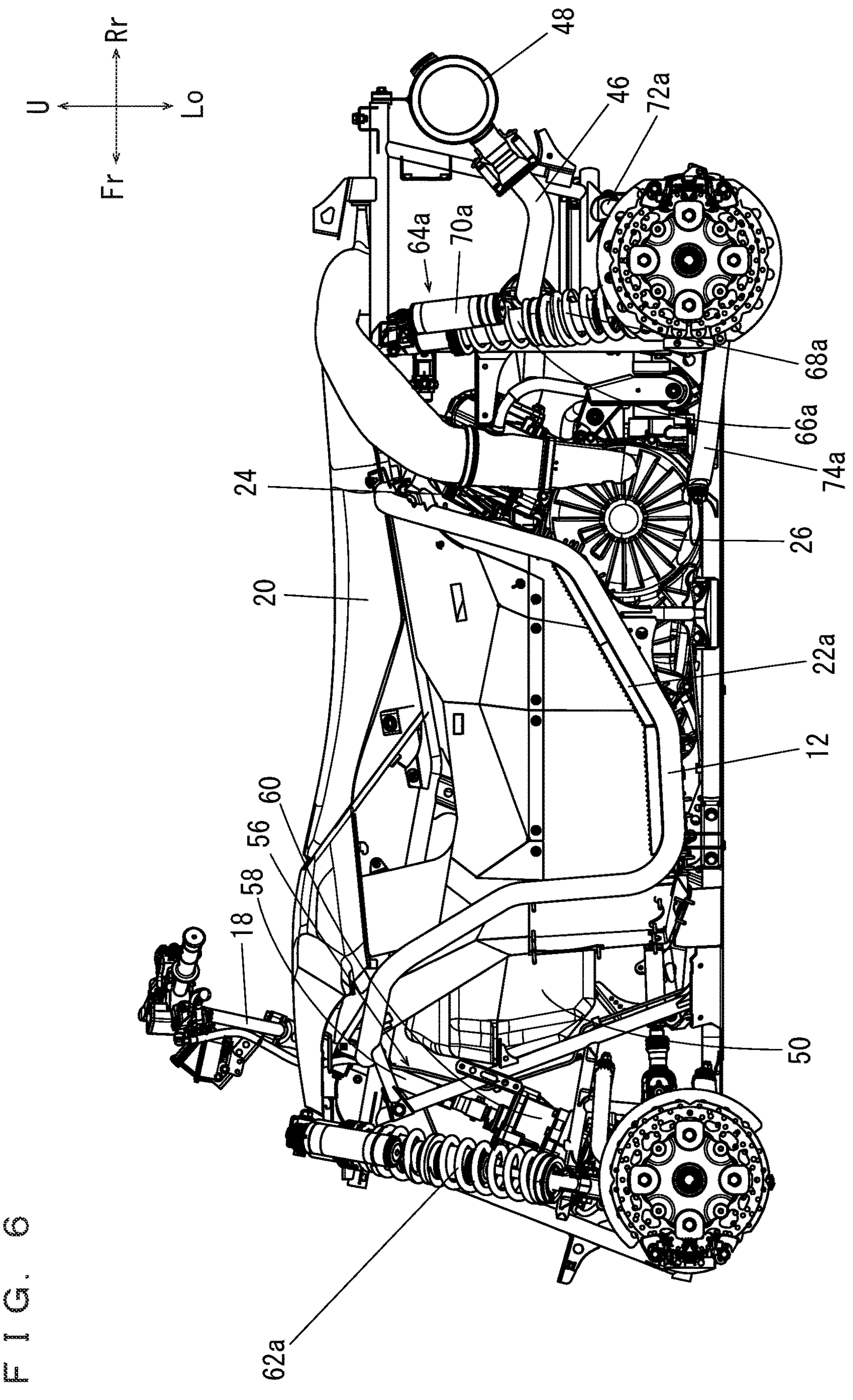
FIG. 6 is a side view which shows a state where wheels, a front fender, etc. are removed from the vehicle in FIG. 1.
Figure 7:
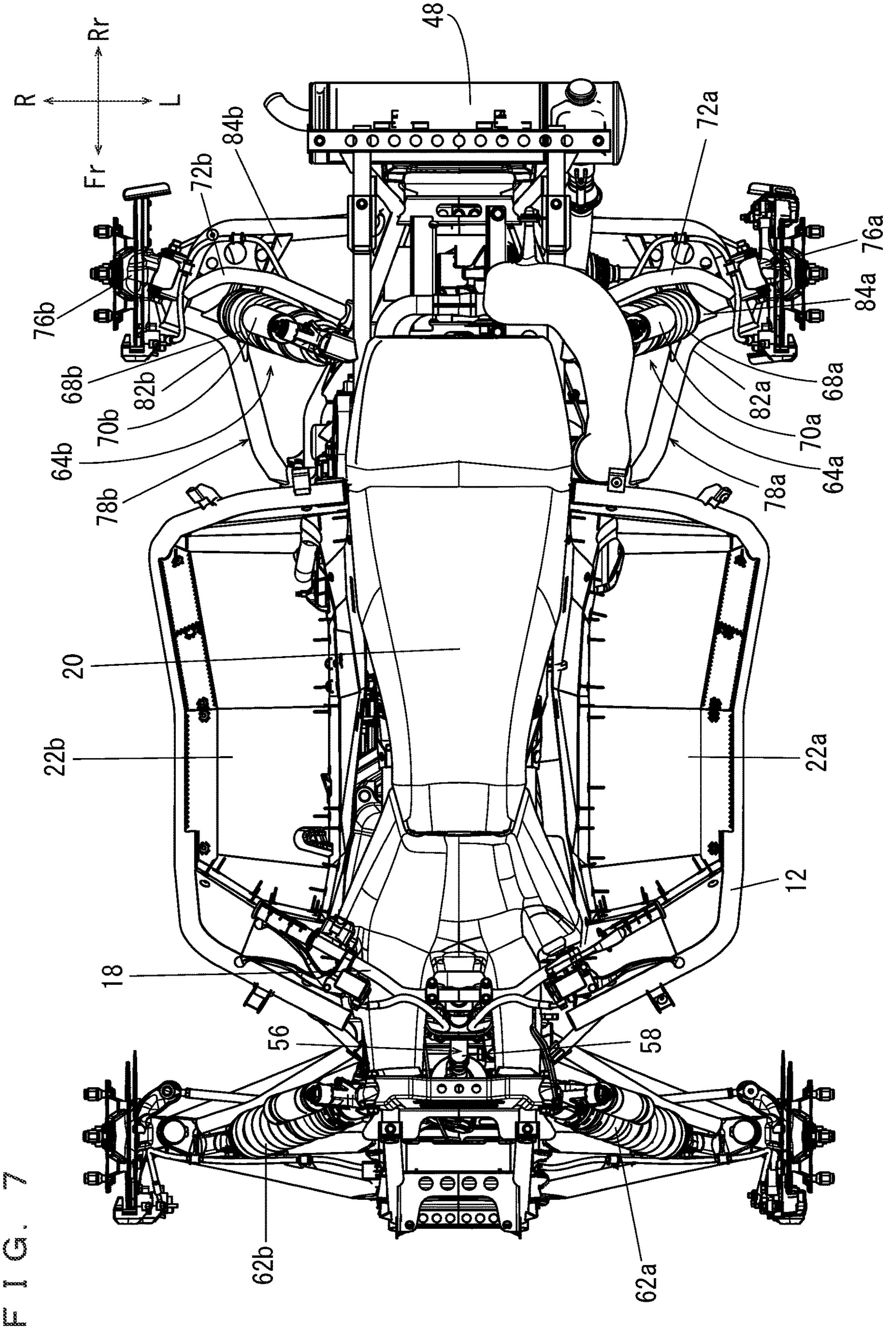
FIG. 7 is a plan view which shows a state where the wheels, the front fender, etc. are removed from the vehicle in FIG. 1.

Hereinafter, embodiments of the present invention will be described with reference to the drawings.

In the drawings, "Fr" indicates forward, "Rr" indicates rearward, "R" indicates rightward, "L" indicates leftward, "U" indicates upward and "Lo" indicates downward.

Referring to FIG. 1 through FIG. 5, a vehicle 10 according to an embodiment of the present invention is a straddled vehicle, and more specifically a four-wheeled ATV, which includes a body frame 12, a pair of front wheels 14*a*, 14*b*, a pair of rear wheels 16*a*, 16*b*, a bar handle 18, a saddle-style seat 20, and a pair of footrests 22*a*, 22*b*.

Referring also to FIG. 6 through FIG. 10, the body frame 12 includes a frame intermediate portion 12*a*, and a frame rear portion extending rearward from the frame intermediate portion 12*a* with a gradually narrower span in a with direction of the vehicle than the frame intermediate portion 12*a*. The pair of front wheels 14*a*, 14*b* are provided at a front portion of the body frame 12 via a pair of suspensions 62*a*, 62*b* (which will be described later). The pair of rear wheels

16*a*, 16*b* are provided at a rear portion of the body frame 12 via a pair of suspensions 64*a*, 64*b* (which will be described later). The bar handle 18 is provided in an intermediate region in the vehicle's width direction, connected at an upper portion of a steering shaft 58 (which will be described later), above the front wheels 14*a*, 14*b* in a side view. The seat 20 is provided at an intermediate portion in the vehicle's width direction, at a higher position than the front wheels 14*a*, 14*b* and the rear wheels 16*a*, 16*b*, between the front wheels 14*a*, 14*b* and the rear wheels 16*a*, 16*b* in a side view, and is supported by the body frame 12. The pair of footrests 22*a*, 22*b*, serving as places where the rider puts his/her respective feet, are provided in the body frame 12, disposed between the front wheels 14*a*, 14*b* and the rear wheels 16*a*, 16*b* in a side view.

Figure 11:
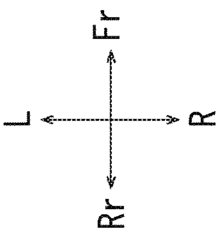
FIG. 11 is a plan view which shows an inside structure of the vehicle in FIG. 1.
Figure 11:
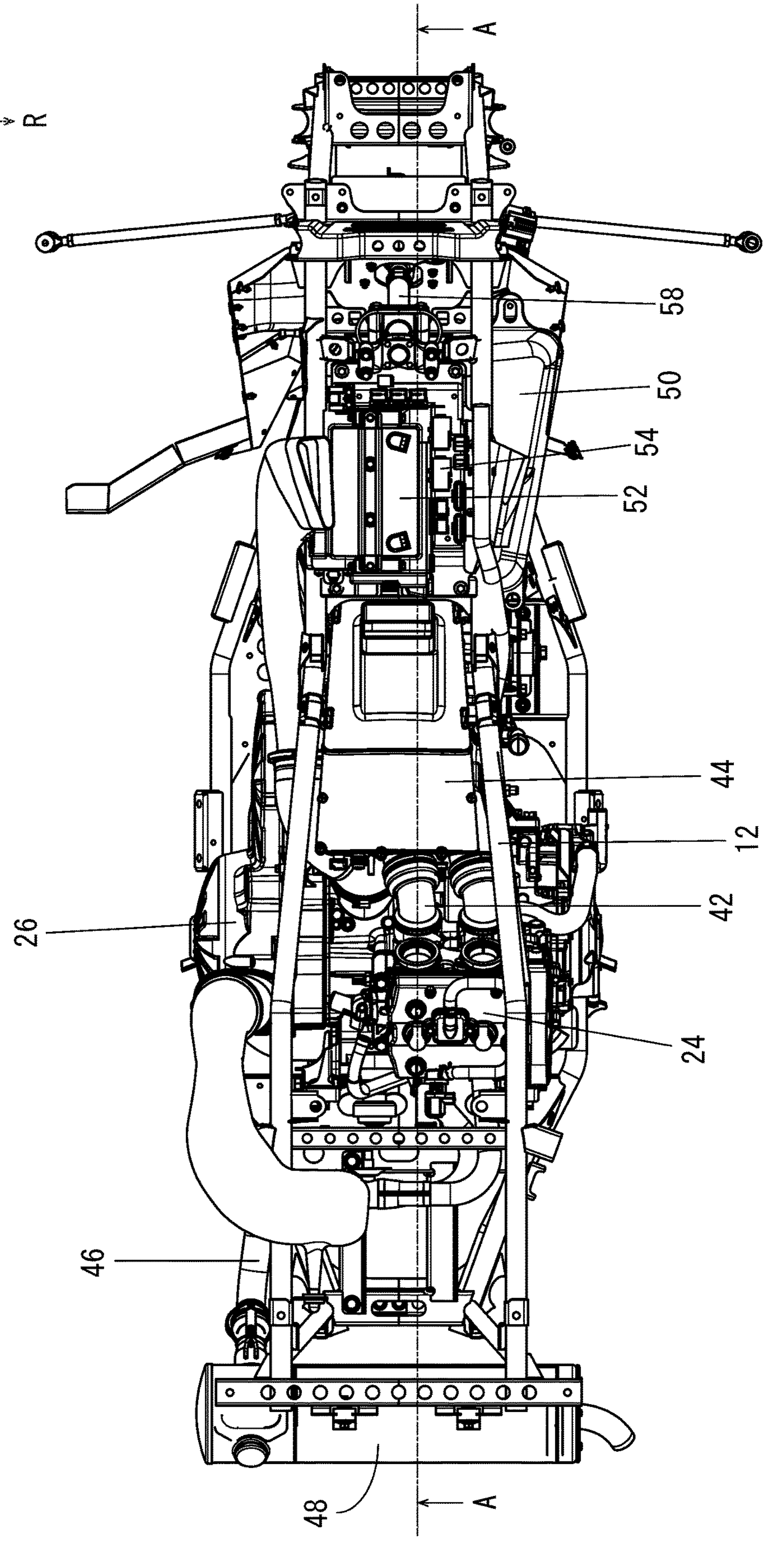
Figure 12:
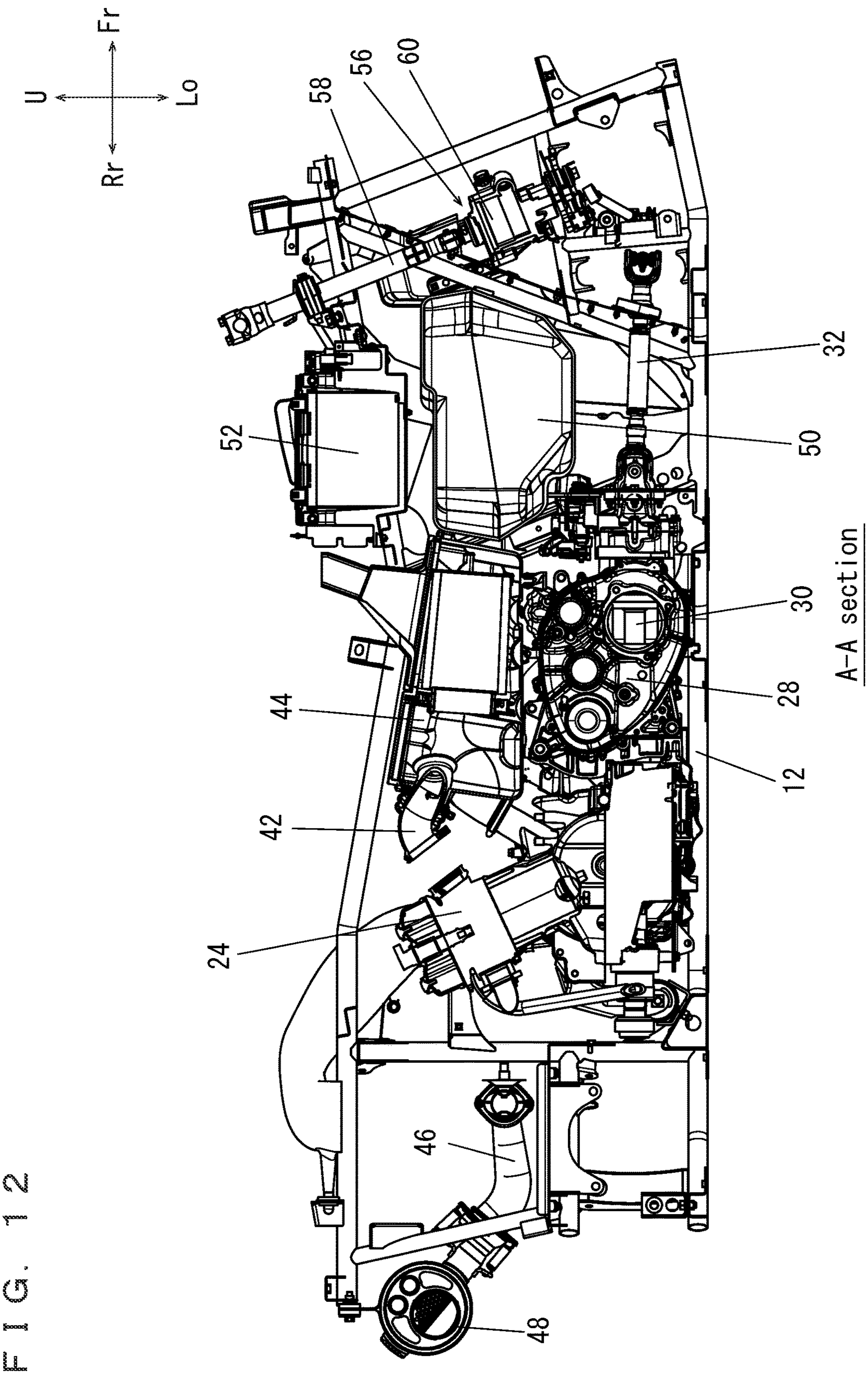
FIG. 12 is a sectional view taken in a line A-A in FIG. 11.

Referring to FIG. 11 and FIG. 12, the vehicle 10 further includes an engine 24 as a prime mover, a continuously variable transmission 26, and a transmission 28. The engine 24, the continuously variable transmission 26 and the transmission 28 are provided in the body frame 12.

In the present embodiment, the engine 24 is provided by a parallel two-cylinder engine, which is installed below the seat 20. The engine 24 is disposed at a place slightly rearward than a center portion in a fore-aft direction of the body frame 12, with a rearward tilt. In other words, the engine 24 is laid in a rear-midship style. The continuously variable transmission 26, which receives an output from the engine 24, is provided on an outer side (left side in the present embodiment) of the engine 24. The transmission 28 is provided ahead of the engine 24 in order to speed-change an output from the continuously variable transmission 26. Therefore, the engine 24 and the transmission 28 are connected with each other via the continuously variable transmission 26.

The vehicle 10 further includes a propeller shaft 30 connected with the transmission 28 and extending in a fore-aft direction; a front shaft 32 connected with a front end portion of the propeller shaft 30 and extending in a fore-aft direction; a rotation transmission portion 34 (see FIG. 8) which transmits rotation coming from the transmission 28 via the propeller shaft 30 and the front shaft 32 to the pair of front wheels 14*a*, 14*b*; a rear shaft (not illustrated) connected with a rear end portion of the propeller shaft 30 and extending in a fore-aft direction; and a rotation transmission portion 36 which transmits rotation coming from the transmission 28 via the propeller shaft 30 and the rear shaft to the pair of rear wheels 16*a*, 16*b*. The rotation transmission portion 36 includes a rear gear 38, and a pair of drive shafts 40*a*, 40*b* (see FIG. 10). The rear gear 38 is provided between the pair of rear wheels 16*a*, 16*b*. The rear gear 38 receives rotation of the rear shaft. The pair of drive shafts 40*a*, 40*b* are provided between the rear gear 38 and the respective one of the pair of rear wheels 16*a*, 16*b*. Therefore, rotation of the rear gear 38 is transmitted to the pair of rear wheels 16*a*, 16*b* via the pair of drive shafts 40*a*, 40*b*.

The rotation transmission portion 34 is connected with the engine 24 via the front shaft 32, the propeller shaft 30, the transmission 28 and the continuously variable transmission 26. The rotation transmission portion 36 is connected with the engine 24 via the rear shaft, the propeller shaft 30, the transmission 28 and the continuously variable transmission 26. Therefore, rotation of the engine 24 undergoes speed changes performed by the continuously variable transmission 26 and the transmission 28, and then is transmitted to the pair of front wheels 14*a*, 14*b* via the propeller shaft 30, the front shaft 32, and the rotation transmission portion 34. This rotates the pair of front wheels 14*a*, 14*b*. Also, rotation of the engine 24 undergoes speed changes performed by the continuously variable transmission 26 and the transmission 28, and then is transmitted to the pair of rear wheels 16*a*, 16*b* via the propeller shaft 30, the rear shaft, and the rotation transmission portion 36. This rotates the pair of rear wheels 16*a*, 16*b*.

The vehicle 10 further includes an air intake pipe 42 connected with the engine 24 in order to supply air into the engine 24, an air cleaner 44 connected with the air intake pipe 42, an exhaust pipe 46 connected with the engine 24 to discharge exhaust from the engine 24, and a muffler 48 connected with the exhaust pipe 46.

The air cleaner 44 is provided ahead of the engine 24 to overlap with the engine 24 in a front view, below the seat 20. The muffler 48 is provided behind the engine 24. The air intake pipe 42 is connected with a front portion of the engine 24. The exhaust pipe 46 is connected with a rear portion of the engine 24. Therefore, the engine 24 has a structure called front intake rear exhaust.

The vehicle 10 further includes a fuel tank 50 which holds fuel to be supplied to the engine 24, and a battery 52 and an electric box 54 which are provided above the fuel tank 50.

The fuel tank 50 is provided at a position diagonally forward and upward of the transmission 28, ahead of the air cleaner 44. The battery 52 and the electric box 54 are provided side by side ahead of the seat 20.

The vehicle 10 further includes a steering mechanism 56 for steering the pair of front wheels 14*a*, 14*b*.

The steering mechanism 56 includes the steering shaft 58, and an electric power steering (EPS) 60 provided on the steering shaft 58. The steering shaft 58 is provided ahead of the seat 20. The electric power steering 60 is provided ahead of the fuel tank 50.

The vehicle 10 further includes the pair of suspensions 62*a*, 62*b* which are provided in the body frame 12 and suspend the pair of front wheels 14*a*, 14*b*; and the pair of suspensions 64*a*, 64*b* which are provided in the body frame 12 and suspend the pair of rear wheels 16*a*, 16*b*.

Referring to FIG. 6 through FIG. 8 and FIG. 10, the pair of suspensions 64*a*, 64*b* include shock absorbers 66*a*, 66*b*; springs 68*a*, 68*b*; reservoir tanks 70*a*, 70*b*; upper arms 72*a*, 72*b*; lower arms 74*a*, 74*b*; and knuckles 76*a*, 76*b*, respectively.

The springs 68*a*, 68*b* are fitted around the outer circumferences of the shock absorbers 66*a*, 66*b* respectively. The shock absorbers 66*a*, 66*b* have their respective upper end portions connected with the reservoir tanks 70*a*, 70*b*. The upper arms 72*a*, 72*b* are respectively connected pivotably with the body frame 12. The lower arms 74*a*, 74*b* are respectively placed below the upper arms 72*a*, 72*b*, and connected pivotably with the body frame 12. The knuckles 76*a*, 76*b* connect the upper arms 72*a*, 72*b* with the lower arms 74*a*, 74*b*, respectively. The shock absorbers 66*a*, 66*b* are provided ahead of the upper arms 72*a*, 72*b* and connect the body frame 12 with the lower arms 74*a*, 74*b* respectively. The upper arms 72*a*, 72*b* are formed in a bent shape to detour (or accommodate) the shock absorbers 66*a*, 66*b* respectively.

The lower arms 74*a*, 74*b* include front arm portions 78*a*, 78*b* and rear arm portions 80*a*, 80*b* respectively.

Figure 8:
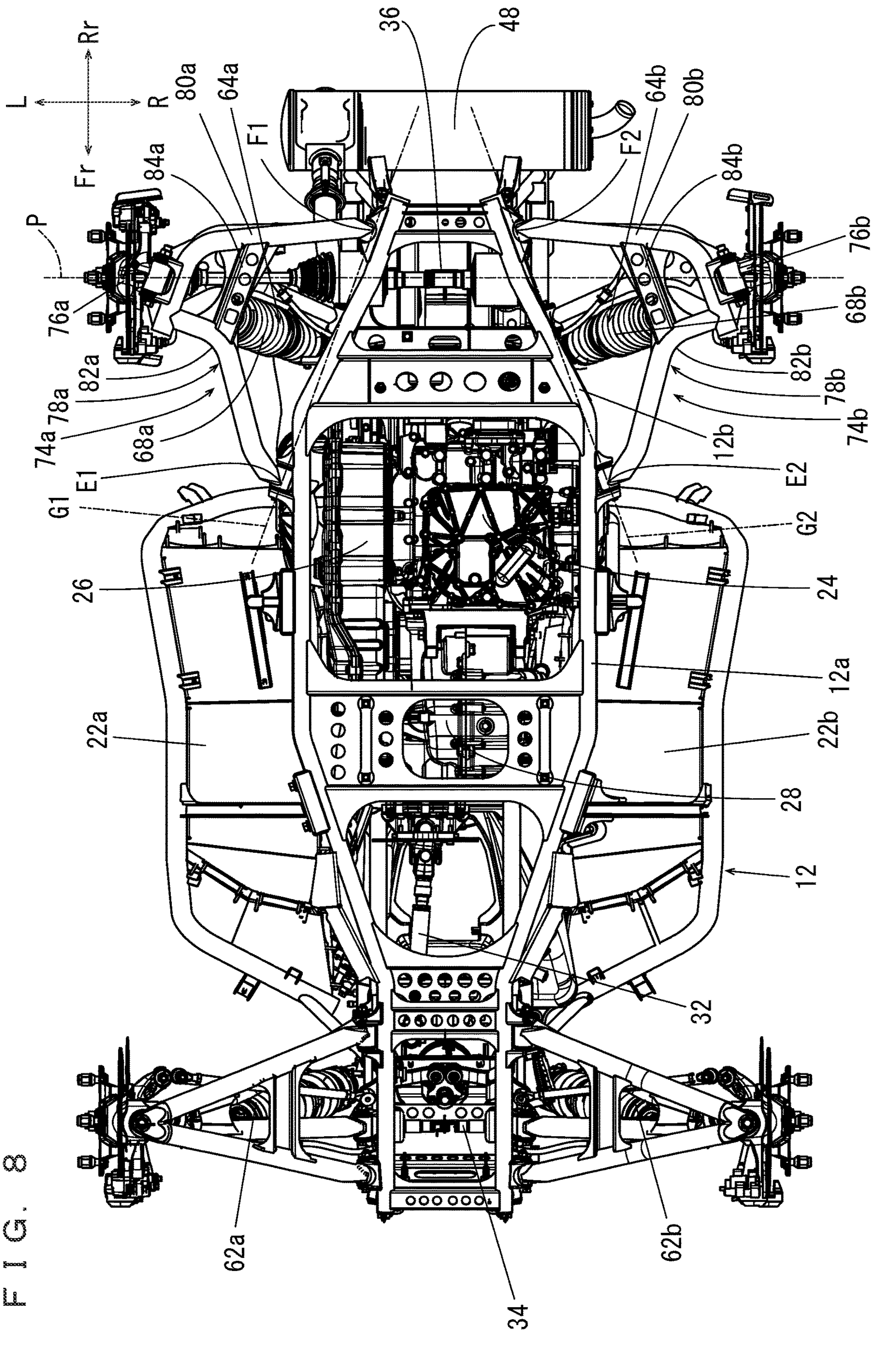
FIG. 8 is a bottom view which shows a state where the wheels, the front fender, etc. are removed from the vehicle in FIG. 1.
Figure 9:
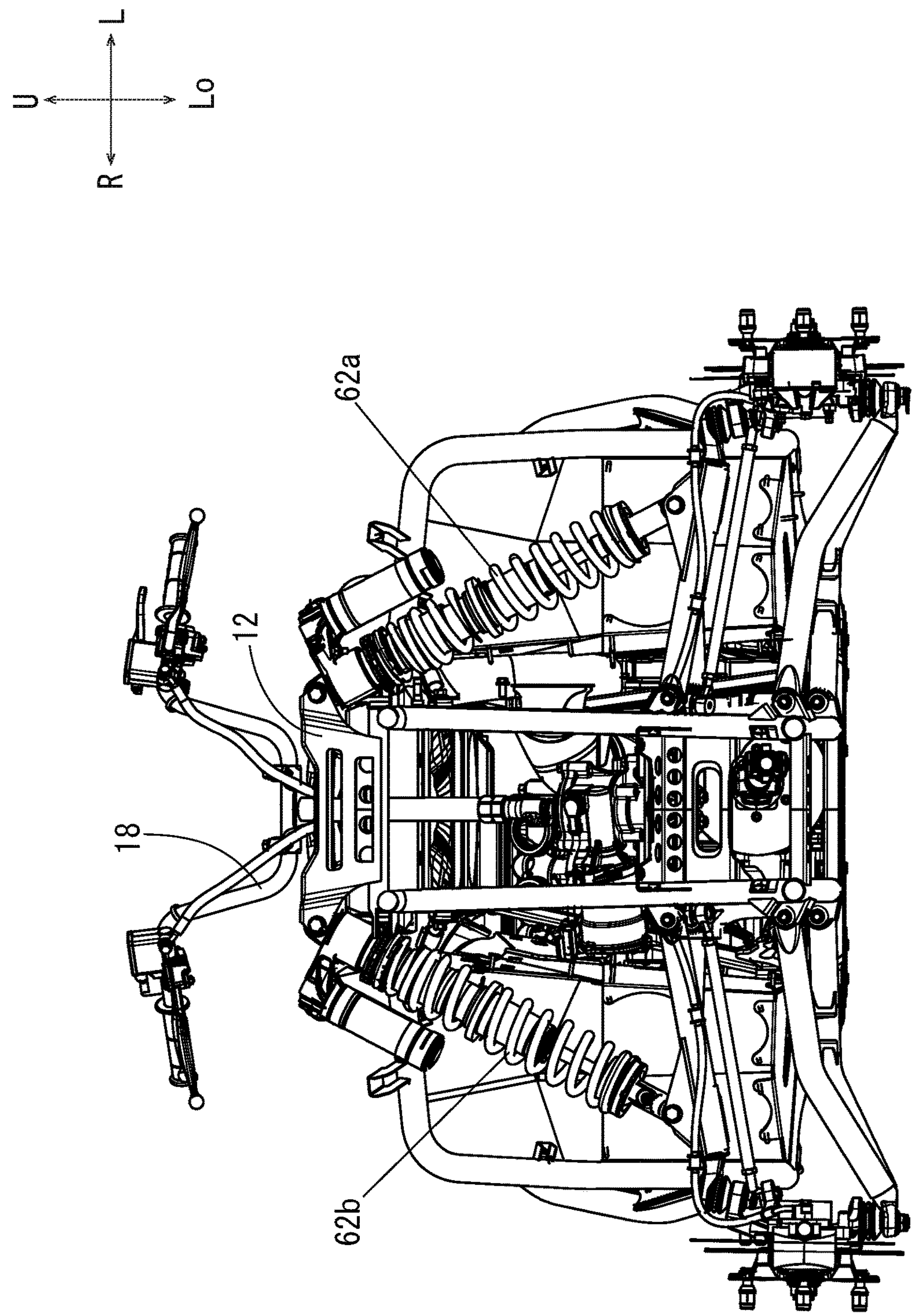
FIG. 9 is a front view which shows a state where the wheels, the front fender, etc. are removed from the vehicle in FIG. 1.
Figure 13:
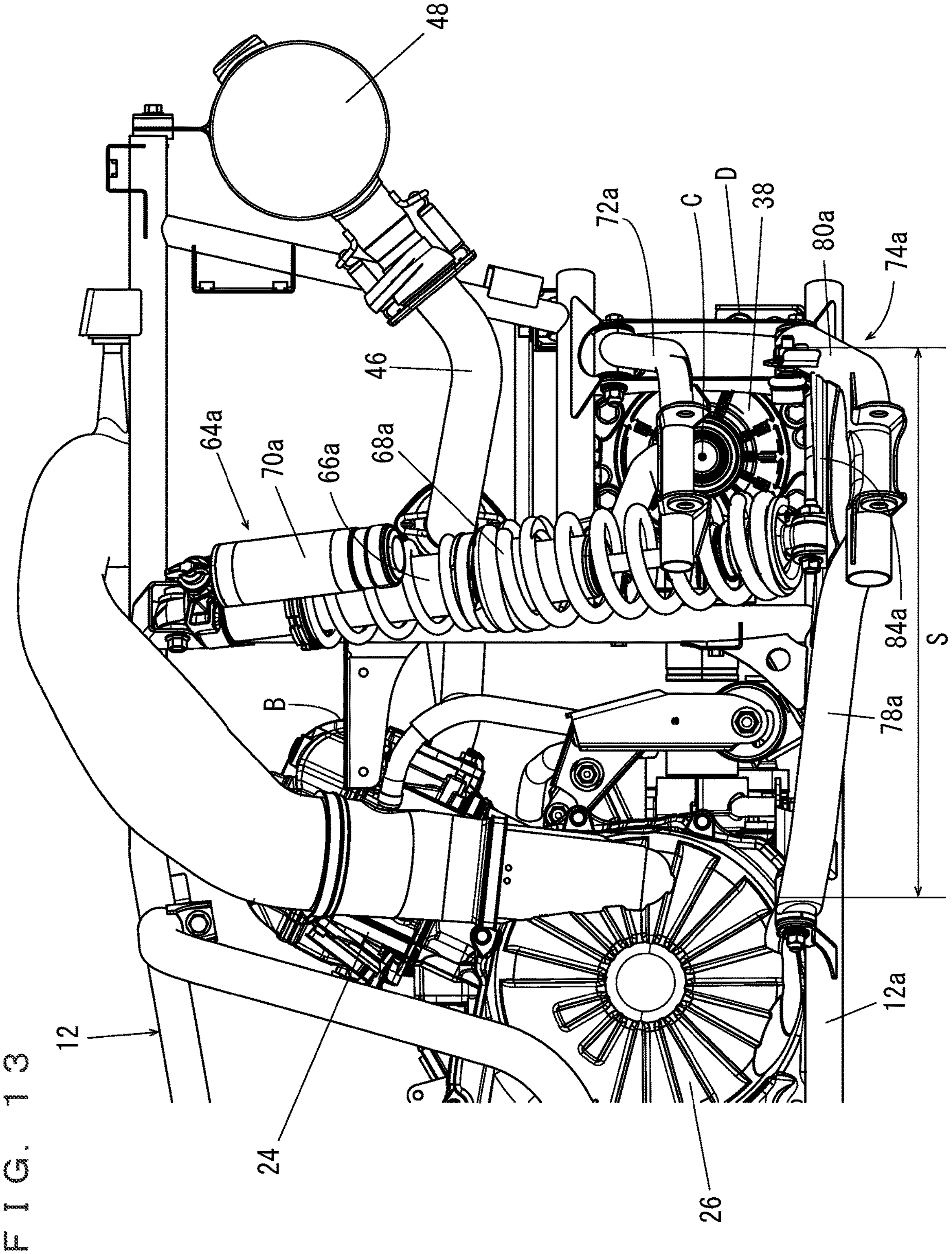
FIG. 13 is a side view which shows a suspension and surrounds thereof on a rear-wheel side.

Referring to FIG. 8 and FIG. 13, the front arm portions 78*a*, 78*b* are connected with the body frame 12 at positions more forward than a rear end B of the engine 24 in a fore-aft direction in a side view. The front arm portions 78*a*, 78*b* are connected with the frame intermediate portion 12*a*. The rear arm portions 80*a*, 80*b* are connected with the body frame 12 at positions more rearward than a center C of the rear gear 38 but more forward than a rear end D of the rear gear 38 in a fore-aft direction in a side view. The rear arm portions 80*a*, 80*b* are connected with the frame rear portion 12*b*. The points of connection E1, E2 where the front arm portions 78*a*, 78*b* are connected with the body frame 12 are more outboard than the points of connection F1, F2 where the rear arm portions 80*a*, 80*b* are connected with the body frame 12 respectively. Therefore, the lower arms 74*a*, 74*b* have their respective hypothetical pivot axes G1, G2, slanted, with respect to the vehicle's fore-aft direction in a plan view, having their front portions opening outward. The lower arms 74*a*, 74*b* can swing around the pivot axes G1, G2, respectively, relative to the body frame 12.

The front arm portions 78*a*, 78*b* have bent portions 82*a*, 82*b* respectively. The lower arms 74*a*, 74*b* further include reinforcing members 84*a*, 84*b* connecting the bent portions 82*a*, 82*b* with the rear arm portions 80*a*, 80*b* respectively. The shock absorbers 66*a*, 66*b* are connected with the lower arms 74*a*, 74*b* near the bent portions 82*a*, 82*b* respectively; more specifically, connected with the reinforcing members 84*a*, 84*b*.

Figure 10:
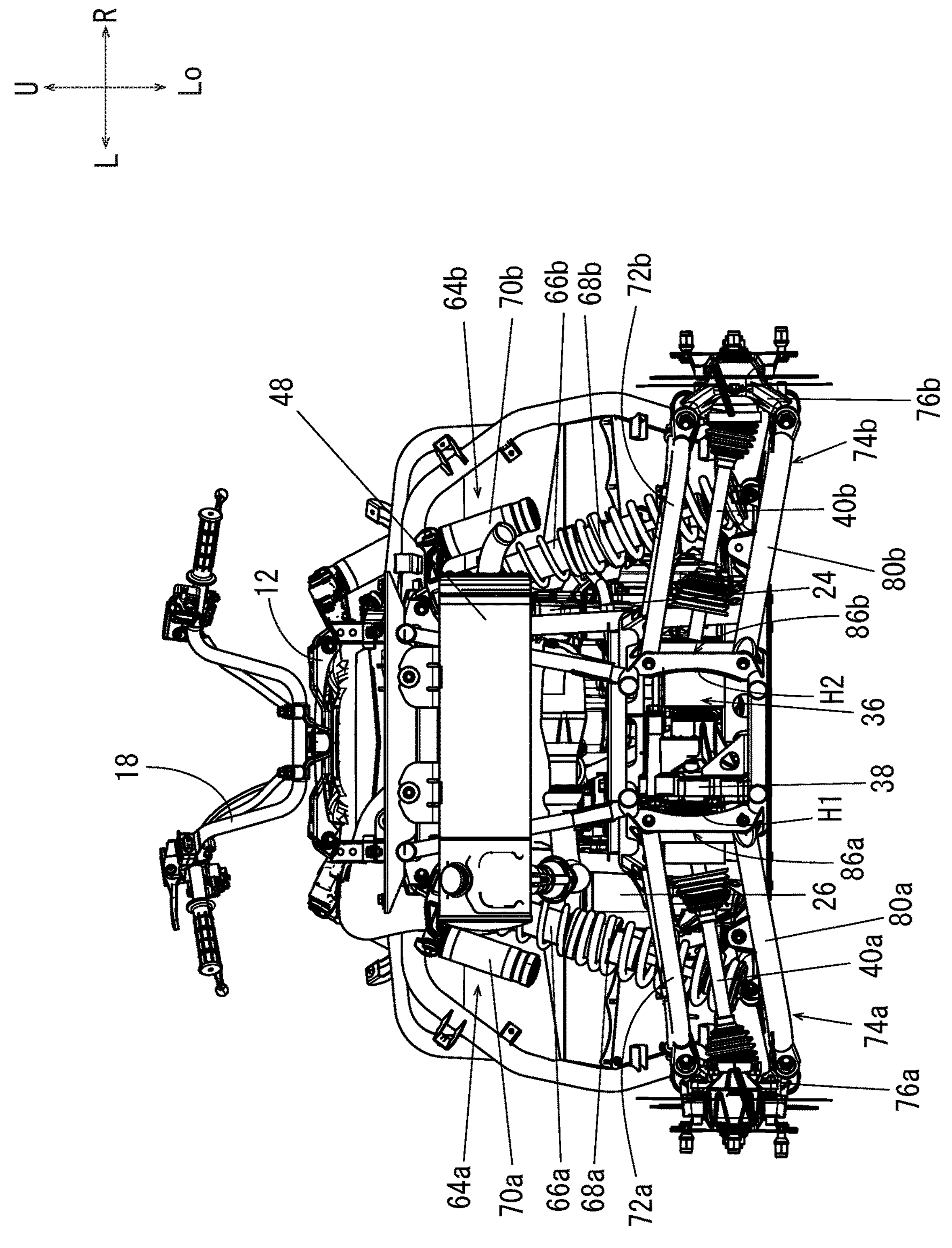
FIG. 10 is a rear view which shows a state where the wheels, the front fender, etc. are removed from the vehicle in FIG. 1.

Referring to FIG. 10, the rear arm portions 80*a*, 80*b* and the upper arms 72*a*, 72*b* are connected with each other with connection brackets 86*a*, 86*b* extending in an up-down direction respectively. In order not to make contact with the rear gear 38, the connection brackets 86*a*, 86*b* have their respective inboard sides H1, H2 carved.

Returning to FIG. 1 through FIG. 5, the vehicle 10 further includes a front fender 88 and a rear fender 90. The front fender 88 is provided above the pair of front wheels 14*a*, 14*b*, striding over the pair of front wheels 14*a*, 14*b*, in a plan view. The rear fender 90 is provided above the pair of rear wheels 16*a*, 16*b*, striding over the pair of rear wheels 16*a*, 16*b*, in a plan view.

According to the vehicle 10 as has been described thus far, in regards of the lower arms 74*a*, 74*b* on the rear-wheel side suspensions 64*a*, 64*b*, the front arm portions 78*a*, 78*b* are connected with the body frame 12 at positions more forward than the rear end B of the engine 24 in a fore-aft direction in a side view while the rear arm portions 80*a*, 80*b* are connected with the body frame 12 at positions more rearward than the center C of the rear gear 38 in a fore-aft direction in a side view. As described, the front arm portions 78*a*, 78*b* are extended to sides of the engine 24, so that the connection points E1, E2 where the front arm portions 78*a*, 78*b* are connected with the body frame 12 are located ahead. Also, the front arm portions 78*a*, 78*b* and the rear arm portions 80*a*, 80*b* are connected with the body frame 12 in such a form that, in a plan view, both of them are opening with respect to a straight line P (see FIG. 8) which connects centers of the pair of rear wheels 16*a*, 16*b*. In other words, the front arm portions 78*a*, 78*b* and the rear arm portions 80*a*, 80*b* are slanted in a fore-aft direction with respect to the straight line P which connects the centers of the pair of rear wheels 16*a*, 16*b*. This makes it possible to increase an arm span S (see FIG. 13) of the lower arms 74*a*, 74*b*, thereby decreasing stress on the lower arms 74*a*, 74*b* and the body frame 12, and to decrease the weight of the lower arms 74*a*, 74*b* and the body frame 12.

The rear arm portions 80*a*, 80*b* are connected with the body frame 12 at positions more forward than the rear end D of the rear gear 38 in a fore-aft direction in a side view. This makes it possible to reduce scraping the bottom of the vehicle 12, i.e., vehicle 12 rubbing the ground with its bottom.

The points of connection E1, E2 where the front arm portions 78*a*, 78*b* are connected with the body frame 12 are more outboard than the points of connection F1, F2 where the rear arm portions 80*a*, 80*b* are connected with the body frame 12. Therefore, it becomes easy to slant the lower arms 74*a*, 74*b* so that their pivot axes G1, G2 have their front portions opening outward, making it easy to dispose the engine 24 at a rear position.

Since the lower arms 74*a*, 74*b* are slanted with respect to the vehicle's fore-aft direction so that their pivot axes G1, G2 have their front portions open outward in a plan view, the pivot axes G1, G2 of the lower arms 74*a*, 74*b* slant to open forward, making it easy to dispose the engine 24 at a rear position.

The front arm portions 78*a*, 78*b* are connected with the frame intermediate portion 12*a*. This makes it possible to position the connection points E1, E2 where the front arm portions 78*a*, 78*b* are connected with the body frame 12 at forward locations, making it possible to increase the arm span S of the lower arms 74*a*, 74*b*.

The rear arm portions 80*a*, 80*b* are connected with the frame rear portion 12*b*. This makes it possible to position the connection points F1, F2 where the rear arm portions 80*a*, 80*b* are connected with the body frame 12 at rearward locations, making it possible to increase the arm span S of the lower arms 74*a*, 74*b*.

The connection brackets 86*a*, 86*b* have their respective inboard sides H1, H2 carved so as not make contact with the rear gear 38. This makes it possible to secure appropriate length of the upper arm and of the lower arm, making it easy to assemble the rear gear 38.

By connecting the shock absorbers 66*a*, 66*b* with the lower arms 74*a*, 74*b*, it becomes possible to use long shock absorbers.

The upper arms 72*a*, 72*b* are formed in a bent shape to detour the shock absorbers 66*a*, 66*b*. This makes it easy to dispose the shock absorbers 66*a*, 66*b* ahead of the upper arms 72*a*, 72*b*.

In the embodiment described above, the prime mover is provided by the engine 24. However, the invention is not limited to this. The prime mover may be provided by a motor.

The present invention being thus far described in terms of preferred embodiments, it is obvious that these may be varied in many ways within the scope and the spirit of the present invention. The scope of the present invention is limited only by the accompanied claims.

The invention claimed is:

1. A vehicle comprising:

a body frame;

a seat provided on the body frame;

a pair of front wheels provided at a front portion of the body frame;

a pair of rear wheels provided at a rear portion of the body frame;

a rear gear provided between the pair of rear wheels and operatively coupled to both of the rear wheels;

a drive source provided below the seat; and a pair of suspensions respectively supporting the pair of rear wheels, each suspension including an upper arm and a lower arm, the lower arm including:

a front arm portion, connected with the body frame at a position more forward than a rear end of the drive source in a fore-aft direction of the vehicle, and a rear arm portion, connected with the body frame at a position more rearward than a center of the rear gear in the fore-aft direction of the vehicle.

2. The vehicle according to claim 1, wherein the rear arm portion of said lower arm is connected with the body frame at a position more forward than a rear end of the rear gear in the fore-aft direction of the vehicle.

3. The vehicle according to claim 1, wherein a connection point of the front arm portion of said lower arm with the body frame is more outboard than a connection point of the rear arm portion of said lower arm with the body frame.

4. The vehicle according to claim 1, wherein said lower arm has a pivot axis, which is slanted with respect to the fore-aft direction of the vehicle so that a front portion of the pivot axis is opening outward.

5. The vehicle according to claim 1, wherein the body frame includes:

a frame intermediate portion, and a frame rear portion extending rearward from the frame intermediate portion, a span of the frame rear portion in the width direction of the vehicle becoming gradually narrower as the frame rear portion extends rearward, and the front arm portion of said lower arm is connected with the frame intermediate portion.

6. The vehicle according to claim 5, wherein the rear arm portion of said lower arm is connected with the frame rear portion.

7. The vehicle according to claim 1, further comprising a pair of connection brackets extending in an up-down direction of the vehicle to respectively connect the pair of rear arm portions with the pair of upper arms, wherein each of the connection brackets has an inboard side thereof carved to have a clearance with the rear gear.

8. The vehicle according to claim 1, wherein each of the suspensions further includes a shock absorber connecting the body frame with the lower arm of said each suspension.

9. The vehicle according to claim 8, wherein in said each suspension, the shock absorber is positioned ahead of the upper arm.

10. The vehicle according to claim 9, wherein in said each suspension, the upper arm is formed in a bent shape to accommodate the shock absorber.

11. The vehicle according to claim 8, wherein in said each suspension, the front arm portion has a bent portion, and the shock absorber is connected with the lower arm at the bent portion.

12. The vehicle according to claim 11, wherein in said each suspension, the lower arm further includes a reinforcing member connecting the bent portion with the rear arm portion, and the shock absorber is connected with the reinforcing member.

13. The vehicle according to claim 1, wherein the pair of lower arms each have a pivot axis, and the two pivot axes are so slanted with respect to the fore-aft direction of the vehicle as to converge behind the pair of lower arms.

14. The vehicle according to claim 1, wherein the drive source is an engine.

15. The vehicle according to claim 1, wherein the vehicle is a straddled vehicle.

16. A vehicle comprising:

a body frame;

a seat provided on the body frame;

a pair of front wheels provided at a front portion of the body frame;

a pair of rear wheels provided at a rear portion of the body frame;

a rear gear provided between the pair of rear wheels;

a drive source provided below the seat; and a pair of suspensions respectively supporting the pair of rear wheels, each suspension including an upper arm and a lower arm, the lower arm including:

a front arm portion, connected with the body frame at a position that is consistently more forward than a rear end of the drive source in a fore-aft direction of the vehicle, and a rear arm portion, connected with the body frame at a position that is consistently more rearward than a center of the rear gear in the fore-aft direction of the vehicle.

17. The vehicle according to claim 16, wherein the drive source is an engine.

18. The vehicle according to claim 16, wherein the vehicle is a straddled vehicle.

* * * * *